(12) United States Patent
Lv et al.

(10) Patent No.: US 12,088,935 B2
(45) Date of Patent: Sep. 10, 2024

(54) CAMERA MODULE FOR THE ADJUSTMENT OF LIGHT INTAKE VIA AN OPTICAL FILTER

(71) Applicant: WINGTECH TECHNOLOGY (SHENZHEN) CO., LTD., Shenzhen (CN)

(72) Inventors: Mingzhen Lv, Shenzhen (CN); Fei Yang, Shenzhen (CN)

(73) Assignee: WINGTECH TECHNOLOGY (SHENZHEN) CO., LTD., Shenzhen (CN)

( * ) Notice: Subject to any disclaimer, the term of this patent is extended or adjusted under 35 U.S.C. 154(b) by 33 days.

(21) Appl. No.: 17/912,069

(22) PCT Filed: Dec. 29, 2020

(86) PCT No.: PCT/CN2020/140830
§ 371 (c)(1),
(2) Date: Sep. 16, 2022

(87) PCT Pub. No.: WO2021/184905
PCT Pub. Date: Sep. 23, 2021

(65) Prior Publication Data
US 2023/0138740 A1    May 4, 2023

(30) Foreign Application Priority Data
Mar. 19, 2020  (CN) .......................... 202010194952.7

(51) Int. Cl.
*H04N 25/53* (2023.01)
*G02B 26/02* (2006.01)
(Continued)

(52) U.S. Cl.
CPC ........... *H04N 25/53* (2023.01); *G02B 26/023* (2013.01); *H04N 23/55* (2023.01); *H04N 23/745* (2023.01)

(58) Field of Classification Search
None
See application file for complete search history.

(56) References Cited

U.S. PATENT DOCUMENTS

| | | | | |
|---|---|---|---|---|
| 2003/0161049 | A1* | 8/2003 | Okada | G02B 7/102 359/696 |
| 2007/0047118 | A1* | 3/2007 | Wakabayashi | G02B 5/205 359/888 |

(Continued)

FOREIGN PATENT DOCUMENTS

| | | | |
|---|---|---|---|
| CN | 201141966 Y | * | 10/2008 |
| CN | 204086641 U | | 1/2015 |

(Continued)

OTHER PUBLICATIONS

International Search Report and Written Opinion from PCT/CN2020/140830 dated Mar. 17, 2021.

*Primary Examiner* — Quan Pham
(74) *Attorney, Agent, or Firm* — Calfee, Halter & Griswold LLP

(57) ABSTRACT

The disclosure relates to a camera module, a control method and apparatus, an electronic device and a storage medium. The camera module includes a camera, the camera includes a lens and a photosensitive element, and the camera module further includes an optical filter assembly. An optical filter in the optical filter assembly and the lens are parallel and located on different planes, and when the optical filter is in a filtered state, the optical filter is located on one side of the photosensitive element facing the lens for reducing an intensity of light entering the photosensitive element.

19 Claims, 5 Drawing Sheets

(51) Int. Cl.
    *H04N 23/55*         (2023.01)
    *H04N 23/745*       (2023.01)

(56) References Cited

U.S. PATENT DOCUMENTS

| | | | | |
|---|---|---|---|---|
| 2007/0085912 A1* | 4/2007 | Hakola | ................ | H04N 23/73 |
| | | | | 348/E5.037 |
| 2007/0247531 A1* | 10/2007 | Deng | ................ | H04N 23/745 |
| | | | | 348/E5.041 |
| 2007/0263101 A1* | 11/2007 | Cho | ................ | H04N 23/70 |
| | | | | 348/226.1 |
| 2008/0037092 A1* | 2/2008 | Umezu | ................ | G03B 7/10 |
| | | | | 359/227 |
| 2018/0091734 A1* | 3/2018 | Jinno | ................ | H04N 23/45 |
| 2019/0014243 A1 | 1/2019 | Malone et al. | | |

FOREIGN PATENT DOCUMENTS

| | | | |
|---|---|---|---|
| CN | 105007429 | A | 10/2015 |
| CN | 106257916 | A | 12/2016 |
| CN | 108174117 | A | 6/2018 |
| CN | 208334779 | U | 1/2019 |
| CN | 111314594 | A | 6/2020 |
| IN | 105007429 | A | 10/2015 |
| JP | 2019205139 | A * | 11/2019 ............. H04N 5/238 |

\* cited by examiner

CAMERA MODULE FOR THE ADJUSTMENT OF LIGHT INTAKE VIA AN OPTICAL FILTER

CROSS REFERENCE TO RELEVANT APPLICATIONS

The present application is based upon International Application No. PCT/CN2020/140830, filed on Dec. 29, 2020, which claims the priority of the Chinese patent application filed on Mar. 19, 2020 before the Chinese Patent Office with the application number of CN202010194952.7 and the title of "CAMERA MODULE, CONTROL METHOD AND APPARATUS, ELECTRONIC DEVICE, AND STORAGE MEDIUM", which is incorporated herein in its entirety by reference.

TECHNICAL FIELD

The present disclosure relates to the technical field of electronic devices, more particularly, to a camera module, a control method and apparatus, an electronic device, and a storage medium.

BACKGROUND

With the progress of society and the development of technology, electronic devices have become an indispensable part of modern people's lives, and camera photographing functions on the electronic devices are also getting more and more attention.

When the amount of incoming light from the camera is not consistent for each exposure, water ripples may be generated on preview screens of the electronic devices. In view of this situation, in the related arts, a refresh frequency of camera preview is generally changed by adjusting a number of pixel rows refreshed by the camera during each exposure to adjust an exposure time of the camera, and adjust the exposure time of the camera preview to an integer multiple of a half-flicker period of an AC light source, so that the camera has the same amount of incoming light during each exposure. However, for the consideration of an imaging effect, the amount of incoming light during each exposure of the camera needs to be controlled within a certain range, that is, the amount of incoming light cannot exceed the maximum value within the limit of the amount of incoming light. Therefore, when a light intensity of an environment increases, it is necessary to appropriately shorten the exposure time of the camera.

However, when the light intensity of the AC light source is so strong that the exposure time cannot be greater than or equal to the half-flicker cycle of the AC light source if even adjusting the light exposure of the camera to the maximum of an exposure range of the camera, the manner of the related art to adjust the number of pixel rows refreshed during each exposure will no longer be able to eliminate the water ripples in the preview screens.

SUMMARY

(I) Technical Problems to be Solved

The technical problems to be solved by the present disclosure are that when a light intensity of an AC light source is so strong that an exposure time cannot be greater than or equal to a half-flicker cycle of the AC light source if even adjusting the light exposure of a camera to the maximum of an exposure range of the camera, the manner to adjust a number of pixel rows refreshed during each exposure will no longer be able to eliminate water ripples in preview screens.

(II) Technical Solutions

In order to solve the foregoing technical problems, the embodiments of the present disclosure provide a camera module, a control method and apparatus, an electronic device and a storage medium, so as to solve the technical problems in the related art that the water ripples exist in the preview screen of the camera when the light intensity of the AC light source is too strong.

According to a first aspect, the embodiments of the present disclosure provide a camera module, wherein the camera module includes a camera, the camera includes a lens and a photosensitive element, the photosensitive element is located at one side of the lens; and the camera module further includes an optical filter assembly, wherein:

an optical filter in the optical filter assembly and the lens are parallel and located on different planes; when the optical filter is in a filtered state, the optical filter is located on one side of the photosensitive element facing the lens, and is configured for reducing an intensity of light entering the photosensitive element; and when the optical filter is in an unfiltered state, the optical filter is located on a vertical plane of a connecting line between the photosensitive element and the lens, and a projection of the optical filter on the plane at which the lens is located does not overlap with the lens.

In some embodiments, when the optical filter is in the filtered state, the optical filter is located between the lens and the photosensitive element, or located at the other side of the lens.

In some embodiments, a projection of the lens on the plane at which the optical filter is located is disposed in the optical filter.

In some embodiments, the optical filter includes a full-band optical filter that absorbs light of each wave band with equal amplitude and an optical filter that absorbs light of a photosensitive wave band of the photosensitive element with equal amplitude.

In some embodiments, the camera module further includes a telescopic support arm in one-to-one correspondence with the optical filter in the optical filter assembly, wherein:

a telescopic end of the telescopic support arm is provided with a corresponding optical filter, and when the telescopic support arm is untended, the optical filter is in the unfiltered state; and when the telescopic support arm is extended, the optical filter is in the filtered state; or, when the telescopic support arm is extended, the optical filter is in the unfiltered state, and when the telescopic support arm is unextended, the optical filter is in the filtered state.

In some embodiments, the camera module further includes a driving device in one-to-one correspondence with the telescopic support arm, wherein:

the driving device is connected with the telescopic end of the telescopic support arm, and is configured for driving the telescopic support arm to switch between the unextended state and the extended state.

In some embodiments, the optical filter assembly includes a plurality of optical filters with fixed light transmission performances, and the light transmission performances of the plurality of optical filters are different from each other.

In some embodiments, the plurality of optical filters are arranged in an increasing light transmission manner.

In some embodiments, the optical filter assembly includes a linearly gradient optical filter, and correspondingly, the driving device is further configured for adjusting a light transmission performance of the linearly gradient optical filter by adjusting an extension length of the telescopic support arm.

In some embodiments, the optical filter assembly further includes a housing, and the housing covers the optical filter when the optical filter is in the unfiltered state.

According to a second aspect, the embodiments of the present disclosure provide an exposure time control method, including:

acquiring an original exposure time of a camera and a half-flicker period of an AC light source, wherein the original exposure time is an exposure time when exposure of the camera is adjusted to a maximum exposure threshold;

if the original exposure time is less than the half-flicker period, adjusting at least one target optical filter in an optical filter assembly to a filtered state; and adjusting a number of pixel rows exposed during each exposure of the camera according to light intensity information filtered by the target optical filter so as to adjust the exposure time of the camera to an integer multiple of the half-flicker period.

In some embodiments, when the optical filter in the optical filter assembly is a linearly gradient optical filter, the adjusting the at least one target optical filter in the optical filter assembly from an unfiltered state to the filtered state includes:

calculating a light intensity reduction proportionality of the camera according to the original exposure time and the half-flicker period;

determining the target optical filter according to the light intensity reduction proportionality and the light transmission performance of the optical filter; and adjusting a telescopic support arm connected with the target optical filter from an unextended state to an extended state by a target driving device corresponding to the target optical filter.

In some embodiments, when the optical filter in the optical filter assembly is a linearly gradient optical filter, the adjusting the at least one target optical filter in the optical filter assembly from an unfiltered state to the filtered state includes:

calculating a light intensity reduction proportionality of the camera according to the original exposure time and the half-flicker period;

calculating a light intensity reduction proportionality of the camera according to the original exposure time and the half-flicker period;

determining an extension length of a telescopic support arm according to the light intensity reduction proportionality and a light transmission change coefficient of the linearly gradient optical filter; and controlling the telescopic support arm by the driving device to extend according to the extension length.

In some embodiments, the adjusting the at least one target optical filter in the optical filter assembly to the filtered state includes:

adjusting all the optical filters in the filtered state in the optical filter assembly to an unfiltered state;

determining at least one optical filter in the optical filter assembly as the target optical filter based on an intensity of light received by a photosensitive element and a preset range of incident light quantity; and adjusting the target optical filter from the unfiltered state to the filtered state.

In some embodiments, an adjustment mode of the exposure time is:

exposure time=number of pixels in each row*number of pixel rows exposed*time needed to generate one pixel; and when a to-be-selected exposure time which is an integer multiple of a product of the number of pixels in each row and the time needed to generate one pixel exists, employing the to-be-selected exposure time as the exposure time.

According to a third aspect, the embodiments of the present disclosure provide an exposure time control apparatus, including:

an acquisition module configured for acquiring an original exposure time of a camera and a half-flicker period of an AC light source, wherein the original exposure time is an exposure time when exposure of the camera is adjusted to a maximum exposure threshold;

an optical filter adjustment module configured for, when the original exposure time is less than the half-flicker period, adjusting at least one target optical filter in an optical filter assembly to a filtered state; and a row number adjustment module configured for adjusting a number of pixel rows exposed during each exposure of the camera according to light intensity information filtered by the target optical filter so as to adjust the exposure time of the camera to an integer multiple of the half-flicker period.

In some embodiments, when the optical filter in the optical filter assembly is an optical filter with fixed light transmission performance, the optical filter adjustment module includes:

a first ratio calculation unit configured for calculating a light intensity reduction proportionality of the camera according to the original exposure time and the half-flicker period when the original exposure time is less than the half-flicker period;

an optical filter determination unit configured for determining the target optical filter according to the light intensity reduction proportionality and the light transmission performance of the optical filter; and a state adjustment unit configured for adjusting a telescopic support arm connected with the target optical filter from an unextended state to an extended state by a target driving device corresponding to the target optical filter.

In some embodiments, when the optical filter in the optical filter assembly is a linearly gradient optical filter, the optical filter adjustment module includes:

a second ratio calculation unit configured for calculating a light intensity reduction proportionality of the camera according to the original exposure time and the half-flicker period;

a length determination unit configured for determining an extension length of a telescopic support arm according to the light intensity reduction proportionality and a light transmission change coefficient of the linearly gradient optical filter; and an extension control unit configured for controlling the telescopic support arm by the driving device to extend according to the extension length.

According to a fourth aspect, the embodiments of the present disclosure provide an electronic device including the camera module according to the embodiments of the present disclosure, which further includes:

one or more processors; and a memory, configured for storing one or more programs, wherein:

when the one or more programs are executed by the one or more processors, the one or more processors are enabled to realize the exposure time control method according to the embodiments of the present disclosure.

According to a fifth aspect, the embodiments of the present disclosure further provide a computer-readable storage medium storing a computer program thereon, wherein the program, when being executed by a processor, implements the exposure time control method according to the embodiments of the present disclosure.

(III) Beneficial Effects

Compared with the prior art, the technical solutions provided by the embodiments of the present disclosure have the following advantages.

According to the camera module, the control method and apparatus, the electronic device and the storage medium provided by embodiments of the present disclosure, the optical filter assembly is arranged in the camera module, and the optical filter in the optical filter assembly and the lens of the camera are parallel and located on different planes; when the optical filter is in the filtered state, the optical filter is located at one side of the photosensitive element facing the lens of the camera, and is configured for reducing the intensity of light entering the photosensitive element in the camera; and when the optical filter is in the unfiltered state, the optical filter is located on the vertical plane of the connecting line between the photosensitive element and the lens in the camera, and the projection of the optical filter on the plane at which the lens is located does not overlap with the lens. According to the embodiments of the present disclosure, by adopting the foregoing technical solutions, the optical filter is provided, and when the light intensity of the AC light source is too strong, the intensity of light entering the camera photosensitive element is reduced through the optical filter, so that the situation that the water ripples in the preview screen of the camera cannot be eliminated when the light intensity of the AC light source in the environment to which the camera belongs can be avoided, and a shooting effect of the camera and photographing experience of a user can be improved.

It is to be understood that the foregoing general description and the following detailed description are exemplary and explanatory only, and cannot limit the present disclosure.

BRIEF DESCRIPTION OF THE DRAWINGS

Other features, objects and advantages of the present disclosure will become more apparent by reading the detailed description of the non-limiting embodiments with reference to the following drawings.

DETAILED DESCRIPTION OF THE EMBODIMENTS

The present disclosure will be further described in detail below with reference to the drawings and embodiments. It should be understood that the specific embodiments described herein are merely illustrative of the present disclosure and are not intended to limit the present disclosure. In addition, it should be noted that, for ease of description, the drawings show only a portion of the contents related to the present disclosure, but not all the contents. Moreover, in case of no conflict, the embodiments in the present disclosure and the features in the embodiments may be combined with each other.

Figure 1:
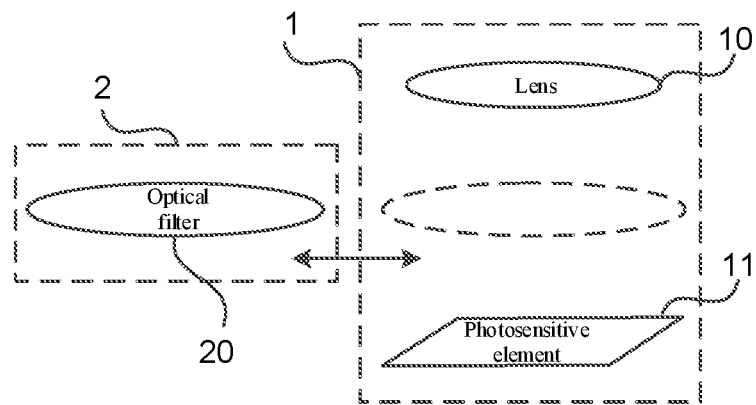
FIG. 1 is a side view of a camera module provided by the embodiments of the present disclosure.
Figure 2:
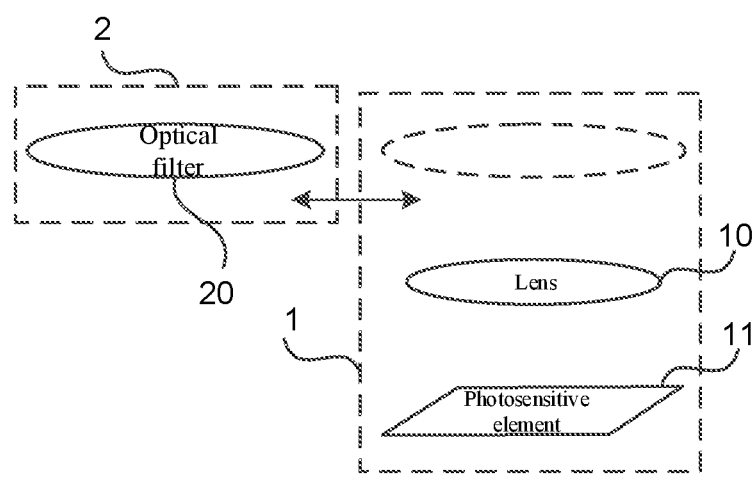
FIG. 2 is a side view of another camera module provided by the embodiments of the present disclosure.

In one embodiment, a camera module is provided. FIG. 1 is a side view of a camera module provided by the embodiments of the present disclosure. FIG. 2 is a side view of another camera module provided by the embodiments of the present disclosure. As shown in FIG. 1 and FIG. 2 (only one optical filter is shown in the figures), the camera module includes a camera 1, the camera 1 includes a lens 10 and a photosensitive element 11, the photosensitive element 11 is located at one side of the lens 10, and the camera module further includes an optical filter assembly 2, wherein an optical filter 20 in the optical filter assembly 2 and the lens 10 are parallel and located on different planes; when the optical filter 20 is in a filtered state, the optical filter 20 is located on one side of the photosensitive element 11 facing the lens 10, and is configured for reducing an intensity of light entering the photosensitive element 11; and when the optical filter 20 is in an unfiltered state, the optical filter 20 is located on a vertical plane of a connecting line between the photosensitive element 11 and the lens 10, and a projection of the optical filter 20 on the plane at which the lens 10 is located does not overlap with the lens 10.

In this embodiment, one or more optical filters 20 may be arranged in the optical filter assembly 2, so that when the optical filter 20 is located on one side of the photosensitive element 11 facing the lens 10 (for example, at a dotted oval position in FIG. 1 or FIG. 2), the projection of the lens 10 on the plane at which the optical filter 20 is located is disposed in the optical filter 20, and external light enters the photosensitive element 11 after passing through the lens 10 and the optical filter 20 or passing through the optical filter 20 and the lens 10 in turn, which can reduce the intensity of light entering the photosensitive element 11, and avoid a situation that water ripples in a preview screen cannot be eliminated when a light intensity of an AC light source in an electronic device is too strong. When the optical filter 20 is not located on one side of the photosensitive element 11 facing the lens 10 (e.g., located at the position of the optical filter 20 shown in FIG. 1 or FIG. 2), as the projection of the optical filter 20 on the plane at which the lens 10 is located does not overlap with the lens 10, external light can enter the photosensitive element 11 after passing through the lens 10 without passing through the optical filter 20, which can ensure imaging trueness of the camera 1 when the external light source is not an AC light source or the light intensity of the AC light source is within a light intensity range that can eliminate water ripples by adjusting a number of pixel rows exposed.

The lens 10 and the photosensitive element 11 may be fixedly connected to a camera support and placed in the same lens cone. A type of the optical filter 20 may be selected according to the need, for example, may be a full-band optical filter capable of absorbing light in various bands (such as infrared band, visible band and ultraviolet band, and the like) with equal amplitude; and may also be a optical filter that can absorb light of a photosensitive wave band of the photosensitive element 11 with equal amplitude so as to further reduce a manufacturing cost of the camera module. The position of the optical filter 20 in the filtered state may be flexibly set, for example, may be located between the lens 10 and the photosensitive element 11 (as shown in FIG. 1), or on one side of the lens 10 facing away from the photosensitive element 11 (as shown in FIG. 2), as long as the light entering the photosensitive element 11 is the light filtered by the optical filter 20. The following description will take the example that the optical filter 20 is located between the lens 10 and the photosensitive element 11 in the filtered state.

In a specific implementation of this embodiment, as shown in FIGS. 3 to 6 (only one optical filter 20 is shown in the figures), the camera module may further include a telescopic support arm 3 in one-to-one correspondence with the optical filter 20 in the optical filter assembly 2, wherein a telescopic end of the telescopic support arm 3 is provided with a corresponding optical filter 20, when the telescopic support arm 3 is unextended, the optical filter 20 is in the unfiltered state, and when the telescopic support arm 3 is extended, the optical filter 20 is in the filtered state; or, when the telescopic support arm 3 is extended, the optical filter 20 is in the unfiltered state, and when the telescopic support arm 3 is unextended, the optical filter 20 is in the filtered state.

Figure 3:
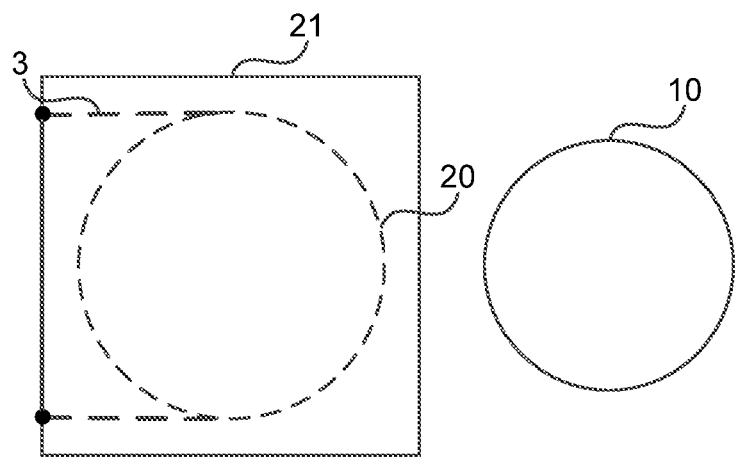
FIG. 3 is a top view of the camera module provided by the embodiments of the present disclosure when an optical filter is in an unfiltered state.
Figure 4:
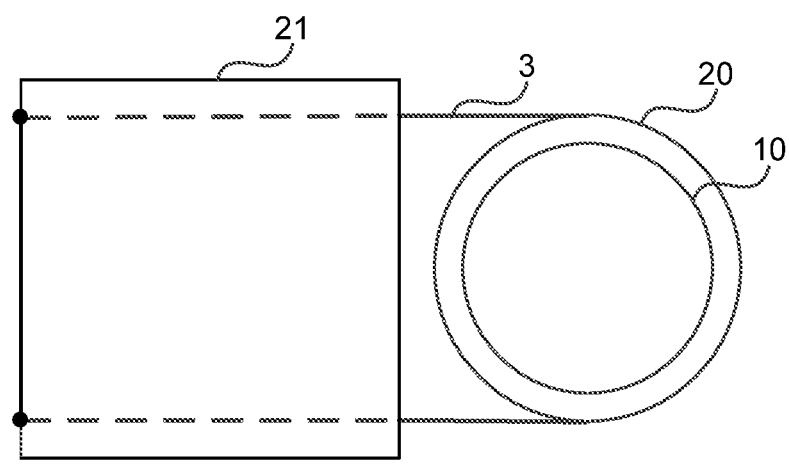
FIG. 4 is a top view of the camera module provided by the embodiments of the present disclosure when the optical filter is in a filtered state.
Figure 5:
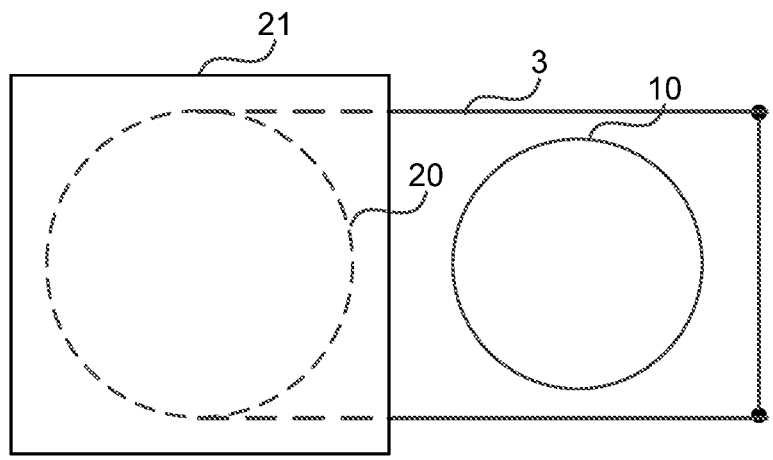
FIG. 5 is a top view of another camera module camera module provided by the embodiments of the present disclosure when an optical filter is in an unfiltered state.
Figure 6:
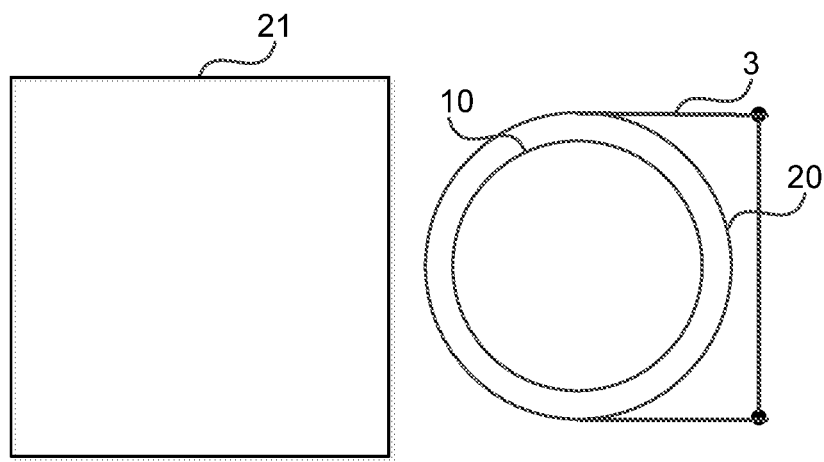
FIG. 6 is a top view of another camera module camera module provided by the embodiments of the present disclosure when the optical filter is in an unfiltered state.

In the foregoing embodiment, the telescopic support arm 3 has a fixed end and the telescopic end, and the fixed end of the telescopic support arm 3 may be fixedly connected to the camera support, the lens cone, other positions of the camera module or the electronic device as long as the telescopic end of the telescopic support arm 3 can be extended and retracted along a direction parallel to the plane at which the lens 10 is located. An optical filter 20 is arranged at an upper rim of the telescopic end of the telescopic support arm 3 along a direction parallel to the plane at which the lens 10 is located. When the telescopic support arm 3 is extended or contracted, the telescopic support arm 3 drives the optical filter 20 thereon to move along the direction parallel to the plane at which the lens 10 is located together with the telescopic end of the telescopic support arm 3, thereby controlling the optical filter 20 to switch between the filtered state and the unfiltered state. When the optical filter 20 is in the unfiltered state, the telescopic support arm 3 may be in the unextended state (as shown in FIG. 3) or the extended state (as shown in FIG. 5). Correspondingly, the telescopic support arm 3 may move the optical filter 20 at the telescopic end to one side of the photosensitive element 11 facing the lens 10 (as shown in FIG. 4) by extending the support arm, or move the optical filter 20 at the telescopic end to one side of the photosensitive element 11 facing the lens 10 (as shown in FIG. 6) by contracting the support arm, thus adjusting the optical filter 20 from the unfiltered state to the filtered state.

In the above embodiment, the telescopic support arm 3 may be extended and contracted by the driving device, and then switched between the extended state and the unexpanded state. In this case, the camera module may further include a driving device in one-to-one correspondence with the telescopic support arm 3, wherein the driving device is connected with the telescopic end of the telescopic support arm 3, and is configured for driving the telescopic support arm 3 to switch between the unextended state and the extended state. Considering miniaturization and integration of the camera module, in one embodiment, the driving device is a motor. In this case, the telescopic end of the telescopic support arm 3 may be directly or indirectly connected with the motor, so that the motor drives the telescopic support arm 3 to extend and contract.

In this embodiment, the optical filter 20 in the optical filter assembly 2 may be an optical filter with non-adjustable light transmission performance or a linearly gradient optical filter with adjustable light transmission performance, which is not limited by this embodiment. In one embodiment, when the optical filter 20 is an optical filter with non-adjustable light transmission performance, a plurality of optical filters 20 may be arranged in the optical filter assembly 2, that is, the optical filter assembly 2 includes a plurality of optical filters with fixed light transmission performances to meet the filtering requirements of the camera 1 under different light intensities. When optical filter 20 is a gradient optical filter, one gradient optical filter may be provided, so as to realize smooth adjustment of the light transmission performance on the premise of meeting the filtering requirements of the camera 1 under different light intensities, and reduce the number of the optical filter 20, the supporting apparatus (such as the telescopic support arm 3) and the driving device of the optical filter 20 20 that need to be configured in the camera module, thereby further reducing a volume and the manufacturing cost of the camera module. In this case, correspondingly, the driving device may also be configured for adjusting the light transmission performance of the linearly gradient optical filter by adjusting an extension length of the telescopic support arm 3, that is, adjusting a relative position between the linearly gradient optical filter and the photosensitive element 11 by adjusting the extension length of the telescopic support arm 3, so as to adjust an absorption degree of the camera 1 to the light entering the photosensitive element 11. In one embodiment, when the optical filter assembly 2 includes a plurality of optical filters with fixed light transmission performances, the plurality of optical filters have the light transmission performances different from each other so as to further reduce the number of optical filters needing to be configured. The plurality of optical filters may be arranged in an increasing light transmission manner, so that the optical filter that needs to be adjusted to the filtered state this time can be determined according to the arrangement sequence of the plurality of optical filters when eliminating the water ripples in the preview screen, thus reducing the control difficulty of the optical filter.

In some embodiments, please continue to refer to FIGS. 3 to 6 continuously. The optical filter assembly 2 may further include a housing 21, and the housing 21 covers the optical filter 20 when the optical filter 20 is in the unfiltered state. Therefore, when the optical filter 20 is not needed for filtering, the optical filter 20 is placed in the housing 21, and the optical filter 20 is protected by the housing 21 to prevent the optical filter 20 from being damaged due to violent vibration or collision with other elements, thus prolonging a service life of the optical filter 20.

The camera module provided by embodiments of the present disclosure is provided with the optical filter, and when the light intensity of the AC light source is too strong, the intensity of light entering the camera photosensitive element is reduced through the optical filter, so that the situation that the water ripples in the preview screen of the camera cannot be eliminated when the light intensity of the AC light source in the environment to which the camera belongs can be avoided, and a shooting effect of the camera and photographing experience of a user can be improved.

Figure 7:
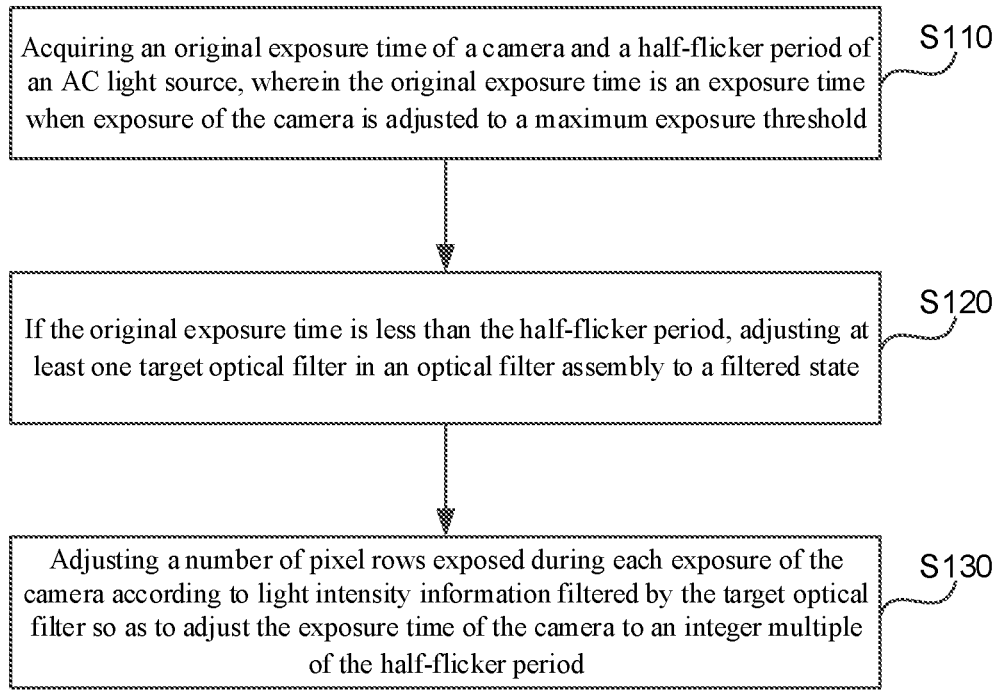
FIG. 7 is a flowchart of an exposure time control method provided by the embodiments of the present disclosure.

In another embodiment, an exposure time control method is provided. The method may be executed by an exposure time control apparatus, wherein the apparatus may be implemented by software and/or hardware, may be generally integrated into an electronic device equipped with a camera, and typically, may be integrated into a mobile phone or a notebook computer, and is suitable for adjusting an exposure time of an electronic device exposed to an AC light source with too strong light intensity. FIG. 7 is a flowchart of an exposure time control method provided by the embodiments of the present disclosure. As shown in FIG. 7, the exposure time control method provided by this embodiment includes the following steps.

At S110, an original exposure time of a camera and a half-flicker period of an AC light source are acquired, wherein the original exposure time is an exposure time when exposure of the camera is adjusted to a maximum exposure threshold.

In this embodiment, when the light intensity of the external AC light source is too strong, the electronic device may directly adopt the exposure time control method provided in this embodiment to adjust the exposure time of the camera; and may also adjust the exposure time of the camera first by adjusting a number of pixel rows exposed during each exposure of the camera, and when the exposure time of the camera is still less than the half-flicker period of the AC light source after adjusting the exposure of the camera to the maximum exposure threshold (that is, there are still water ripples in a preview screen after adjusting the number of pixel rows exposed), and then adopt the exposure time control method provided in this embodiment to further adjust the exposure time of the camera, so as to improve authenticity of the screen shot by the camera on the premise of eliminating the water ripples in the preview screen. This situation will be explained as an example below.

Exemplary, the electronic device may acquire the original exposure time of the camera and the half-flicker period of the AC light source when detecting that the exposure of the camera is the preset maximum exposure threshold; and may also to acquire the original exposure time of the camera and the half-flicker period of the AC light source when the detected exposure of the camera is the preset maximum exposure threshold and the last detected exposure does not reach the maximum exposure threshold. This embodiment is not limited to this. The original exposure time of the camera may be calculated based on the exposure of the camera (i.e. the maximum exposure threshold) detected at the current moment and the original light intensity entering the photosensitive element of the camera by the following formula (1). The half-flicker period of the AC light source is a half of a flicker period of the AC light source, and the flicker period of the AC light source may be determined based on a change period of the original light intensity of the camera detected within a preset time duration.

$$\text{Exposure during each exposure} = \text{light intensity} * \text{exposure time} \quad (1)$$

At S120, if the original exposure time is less than the half-flicker period, at least one target optical filter in an optical filter assembly is adjusted to a filtered state.

When the light intensity of the AC light source is too strong, the electronic device may adjust the exposure time of the camera by adjusting the number of pixel rows exposed during each exposure of the camera first. Therefore, when the acquired original exposure time is less than the half-flicker period of the AC light source, it means that the exposure time of the camera can no longer be adjusted to an integer multiple of the half-flicker period of the AC light source by means of adjusting the number of pixel rows exposed in the current light intensity. Therefore, in this embodiment, the target optical filter in the optical filter assembly may be adjusted to the filtered state in this case to reduce the intensity of light entering the photosensitive element of the camera through the target optical filter. The switching of the optical filter between the filtered state and the unfiltered state can be realized by sending a driving instruction to a driving device corresponding to the optical filter, for example, sending a driving instruction to the driving device, and the driving device controls a telescopic support arm to extend or contract based on the driving instruction, so as to drive the optical filter to move towards or away from a middle vertical line of the lens in a direction parallel to the lens, thereby realizing the switching of the optical filter between the filtered state and the unfiltered state.

In this embodiment, when it is determined that the original exposure time is less than the half-flicker period of the AC light source, all the optical filters in the optical filter assembly in the filtered state may be adjusted to the unfiltered state first, after the adjustment is completed, the target optical filter is determined based on the intensity of light received by the photosensitive element and a preset range of incident light quantity, and the target filter is adjusted from the target optical filter to the filtered state. It is also possible to directly determine the target filter according to the original exposure time and the half-flicker period needed and adjust the target optical filter to the filtered state, regardless of whether the camera already has the optical filter in the filtered state. In order to further reduce a workload required for adjusting the optical filter, in one embodiment, this embodiment can directly determine the target optical filter according to the original exposure time and the half-flicker period when the original exposure time is less than the half-flicker period of the AC light source, and adjust the target optical filter to the filtered state.

Exemplarily, when a light transmission performance of the optical filter in the optical filter assembly is fixed, a proportionality coefficient needing to be reduced (i.e., a light intensity reduction proportionality) for the intensity of light received by the photosensitive element at the current moment may be calculated according to the original exposure time of the camera and the half-flicker period of the AC light source firstly, and an optical filter with a filter performance coefficient or a product of filter performance coefficients closest and no less than the light intensity reduction proportionality can be selected as the target filter from the optical filters in the optical filter assembly in the unfiltered state, then the driving instruction is sent to a target driving device corresponding to the target optical filter, and the telescopic support arm is controlled to extend to a set length by the driving device, thus adjusting the target optical filter to the filtered state. In this case, in one embodiment, the adjusting the at least one target optical filter in the optical filter assembly from the a unfiltered state to the filtered state includes: calculating a light intensity reduction proportionality of the camera according to the original exposure time and the half-flicker period; determining the target optical filter according to the light intensity reduction proportionality and the light transmission performance of the optical filter; and adjusting the telescopic support arm connected with the target optical filter from an unextended state to an extended state by the target driving device corresponding to the target optical filter. The preset length is a distance that the optical filter moves from an original position in the unfiltered state to a position when a center of the optical filter is located on a bisector of the lens, which may be obtained by measurement in advance. The filter performance coefficient of the optical filter is used to characterize a degree of the light transmission performance of the optical filter. The larger the filter performance coefficient n of the optical filter is, the stronger the light transmission performance of the optical filter is, that is, the weaker the ability of the optical filter to absorb light, wherein $0<n<1$.

Exemplarily, when the optical filter in the optical filter assembly is a linearly gradient optical filter, the light intensity reduction proportionality of the camera may be calculated according to the original exposure time and the half-flicker; an extension length of the telescopic support arm is determined according to the light intensity reduction proportionality and a light transmission change coefficient of the linearly gradient optical filter; and the telescopic support arm is controlled by the driving device to extend according to the extension length. For example, the proportionality coefficient needing to be reduced (i.e., a light intensity reduction proportionality) for the intensity of light received by the photosensitive element at the current moment may be calculated according to the original exposure time of the camera and the half-flicker period of the AC light source firstly; then, a light transmission performance coefficient of the optical filter on the linearly gradient optical filter is determined to be location information of a target location of the light intensity reduction proportionality according to a light transmittance change coefficient of the linearly gradient optical filter, so as to determine a target extension length of the telescopic support arm when the target location is located on a bisector between the linearly gradient optical filter and the optical filter, and send a driving instruction to the driving device to control the driving device to adjust the extension length of the telescopic support arm to be the target extension length. The light transmittance change coefficient of the linearly gradient optical filter is configured for measuring the change of the light transmission performance coefficient of the linearly gradient optical filter when moving a unit distance.

In this step, after determining that the original exposure time is less than the half-flicker period of the AC light source, the target optical filter may be automatically adjusted to the filtered state; and the target optical filter may also be adjusted to the filtered state based on a triggering operation of a user. For example, when determining that the original exposure time is less than the half-flicker period of the AC light source, the user is asked whether the optical filter needs to be enabled (the preview screen with water ripples is still displayed during the inquiry process). If the user chooses not to disable (for example, clicking the "disable button" in an interface), the operation is ended. If the user chooses to enable (for example, clicking the "enable button" in the interface), the target optical filter is determined and adjusted to the filtered state.

At S130, a number of pixel rows exposed during each exposure of the camera is determined according to light intensity information filtered by the target optical filter so as to adjust the exposure time of the camera to an integer multiple of the half-flicker period.

Exemplary, the light intensity information of light entering the photosensitive element after being filtered by the optical filter may be obtained; according to the light intensity information, preset maximum exposure threshold and minimum exposure threshold of the camera during each exposure, the formula (1) is adopted to calculate the adjustable maximum exposure time and minimum exposure time of the camera under the current light intensity, so as to obtain an exposure time adjustment range of the camera under the current light intensity. Furthermore, within the exposure time adjustment range, an exposure time which is an integer multiple of the half-flicker period of the AC light source is selected as a target exposure time, and according to the target exposure time, the following formula (2) is adopted to calculate a target number of pixel rows exposed of the camera during each exposure under the current light intensity, and control pixels of the camera with a number of rows exposed during each exposure matched with the target number of pixel rows exposed, so that the exposure time of the camera can be adjusted to the integer multiple of the half-flicker period.

$$\text{Exposure time} = \text{number of pixels in each row} * \text{number of pixel rows exposed} * \text{time needed to generate one pixel} \qquad (2)$$

In the above exemplary description, when there are multiple to-be-selected exposure time which are integral multiples of the half-flicker period of the AC light source within the exposure time adjustment range, the maximum to-be-selected exposure time or the minimum to-be-selected exposure time can be selected and randomly selected as the target exposure time. Considering the simplicity of subsequent exposure control, in one embodiment, when an to-be-selected exposure time that is an integer multiple of a product of the number of pixels in each row and the time needed to generate one pixel exists, the to-be-selected exposure time is used as the target exposure time, so that the number of pixel rows exposed during each exposure is an integer value, so as to reduce exposure control complexity.

In addition, in order to ensure that the light intensity of the optical filter can be adjusted in time when a light intensity of an environment in which the electronic device is located changes, in one embodiment, after the exposure time of the camera is adjusted to an integer multiple of the half-flicker period, a second light intensity of light received by the photosensitive element can be periodically obtained, and when an absolute value of a difference between the second light intensity and the first light intensity corresponding to the light intensity information is greater than a preset change amplitude threshold, all the optical filter in the optical filter assembly are adjusted to the unfiltered state, and the process returns to S110. Alternatively, when the absolute value of the difference between the first light intensity and the second light intensity is greater than the preset change amplitude threshold, according to a first exposure time t1 of the camera under the first light intensity, a total light transmission performance coefficient n1 of the adjusted optical filter in the filtered state and a second exposure time t2 of the camera under the second light intensity, the following formula (3) is adopted to calculate a total light transmission performance coefficient n2 of the optical filter that needs to be adjusted to the filtered state at the current moment. If $n2 \geq 1$, it means that the light does not need to be filtered through the optical filter under the second light intensity, and all the optical filters in the optical filter assembly in the filtered state are adjusted to the unfiltered state. If $n2<1$, the state (for the case that the optical filter in the optical filter assembly is an optical filter with fixed light transmission performance) or the light transmission performance (for the case that the optical filter in the optical filter assembly is a linearly gradient optical filter) of the optical filter in the optical filter assembly are adjusted to adjust the total light transmission performance coefficient of the optical filter in the filtered state to n2, and the process returns to S130.

$$t1/n1=t2/n2 \quad (3)$$

When calculating the second exposure time t2, the original light intensity before filtering at the current moment may be firstly calculated according to the second light intensity and the total light transmission performance coefficient n1 of the optical filter in the filtered state at the current moment, and then the second exposure time t2 of the camera without filtering through the optical filter may be calculated according to the original light intensity.

According to the exposure time control method provided by embodiments of the present disclosure, the original exposure time when the exposure of the camera reaches the maximum exposure threshold and the half-flicker period of the AC light source are acquired, the at least one target optical filter in the optical filter assembly is adjusted to the filtered state by the optical filter adjustment module if the original exposure time is less than the half-flicker period, and the number of pixel rows exposed during each exposure of the camera is adjusted according to the light intensity information filtered by the target optical filter, so that the exposure time of the camera is adjusted to be the integer multiple of the half-flicker period of the AC light source. According to this embodiment, by adopting the foregoing technical solutions, when the light intensity of the AC light source is too strong, the intensity of light entering the camera photosensitive element is reduced through the optical filter, so that the situation that the water ripples in the preview screen of the camera cannot be eliminated when the light intensity of the AC light source in the environment to which the camera belongs can be avoided, and a shooting effect of the camera and photographing experience of a user can be improved.

Figure 8:
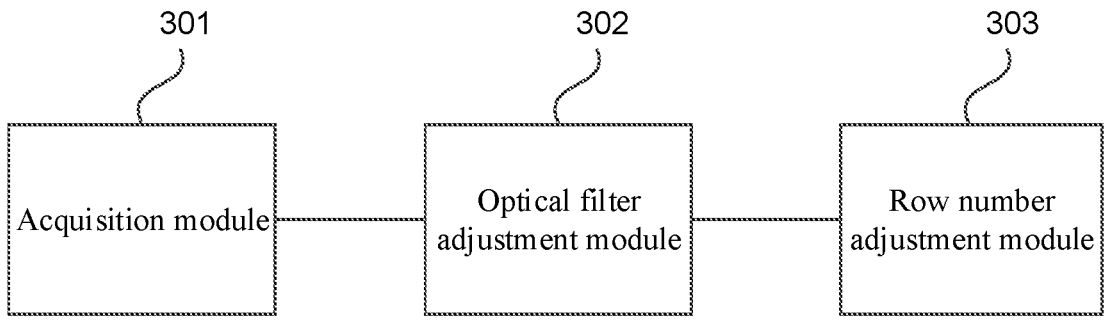
FIG. 8 is a structural block diagram of an exposure time control apparatus provided by the embodiments of the present disclosure.

The embodiments of the present disclosure further provide an exposure time control apparatus. The apparatus may be implemented by software and/or hardware, may be generally integrated into an electronic device equipped with a camera, and typically, may be integrated into a mobile phone or a notebook computer, which controls an exposure time of a camera by executing an exposure time control method. FIG. 8 is a structural block diagram of the exposure time control apparatus provided by the embodiments of the present disclosure. As shown in FIG. 8, the exposure time control apparatus includes an acquisition module 301, an optical filter adjustment module 302 and a row number adjustment module 303, wherein:

the acquisition module 301 is configured for acquiring an original exposure time of a camera and a half-flicker period of an AC light source, wherein the original exposure time is an exposure time when exposure of the camera is adjusted to a maximum exposure threshold;

the optical filter adjustment module 302 is configured for, when the original exposure time is less than the half-flicker period, adjusting at least one target optical filter in an optical filter assembly to a filtered state; and the row number adjustment module 303 is configured for adjusting a number of pixel rows exposed during each exposure of the camera according to light intensity information filtered by the target optical filter so as to adjust the exposure time of the camera to an integer multiple of the half-flicker period.

According to the exposure time control apparatus provided by embodiments of the present disclosure, the original exposure time when the exposure of the camera reaches the maximum exposure threshold and the half-flicker period of the AC light source are acquired by the acquisition module, the at least one target optical filter in the optical filter assembly is adjusted to the filtered state by the optical filter adjustment module when the original exposure time is less than the half-flicker period, and the number of pixel rows exposed during each exposure of the camera is adjusted by the row number adjustment module according to the light intensity information filtered by the target optical filter, so that the exposure time of the camera is adjusted to be the integer multiple of the half-flicker period of the AC light source. According to this embodiment, by adopting the foregoing technical solutions, when the light intensity of the AC light source is too strong, the intensity of light entering the camera photosensitive element is reduced through the optical filter, so that the situation that the water ripples in the preview screen of the camera cannot be eliminated when the light intensity of the AC light source in the environment to which the camera belongs can be avoided, and a shooting effect of the camera and photographing experience of a user can be improved.

In the foregoing solution, when the optical filter in the optical filter assembly is an optical filter with fixed light transmission performance, the optical filter adjustment module 302 may include: a first ratio calculation unit configured for calculating a light intensity reduction proportionality of the camera according to the original exposure time and the half-flicker period when the original exposure time is less than the half-flicker period; an optical filter determination unit configured for determining the target optical filter according to the light intensity reduction proportionality and the light transmission performance of the optical filter; and a state adjustment unit configured for adjusting a telescopic support arm connected with the target optical filter from an unextended state to an extended state by a target driving device corresponding to the target optical filter.

In the foregoing solution, when the optical filter in the optical filter assembly is a linearly gradient optical filter, the optical filter adjustment module 302 may include: a second ratio calculation unit configured for calculating a light intensity reduction proportionality of the camera according to the original exposure time and the half-flicker period; a length determination unit configured for determining an extension length of a telescopic support arm according to the light intensity reduction proportionality and a light transmission change coefficient of the linearly gradient optical filter; and an extension control unit configured for controlling the telescopic support arm by the driving device to extend according to the extension length.

The exposure time control apparatus provided by the provided by embodiments of the present disclosure can implement the exposure time control method provided by any embodiment of the present disclosure, and has corresponding functional modules and beneficial effects for implementing the exposure time control method. For technical details not described in detail in this embodiment, please refer to the exposure time control method provided by any embodiment of the present disclosure.

Figure 9:
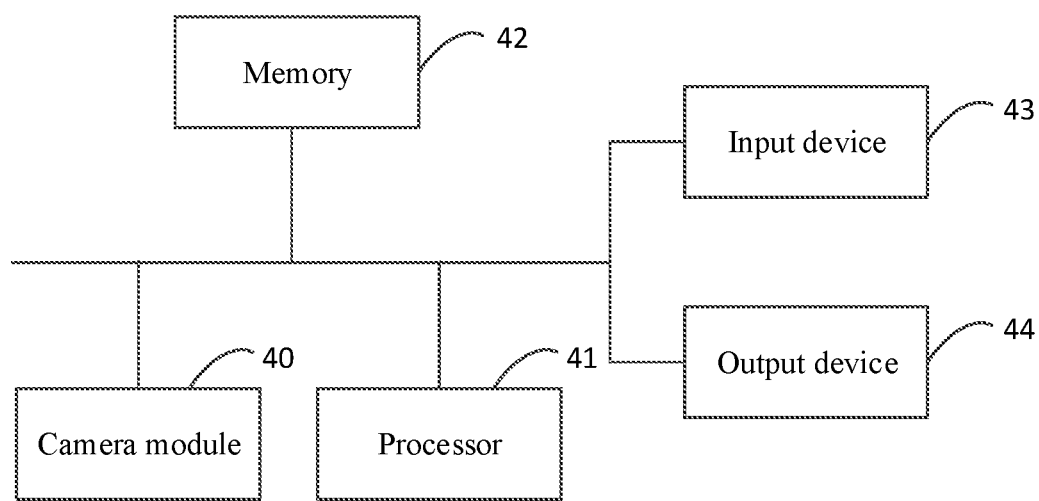
FIG. 9 is a schematic structural diagram of an electronic device provided by the embodiments of the present disclosure.

The embodiments of the present disclosure further provide an electronic device. FIG. 9 is a schematic structural diagram of an electronic device provided by the embodiments of the present disclosure. As shown in FIG. 9, the electronic device includes a camera module 40, a processor 41 and a memory 42, and may also include an input device 43 and an output device 44. The number of the processor 41 in the electronic device may be one or more, and one processor 41 is taken as an example in FIG. 9. The processor 41, the memory 42, the input device 43, and the output device 44 in the electronic device may be connected via a bus or otherwise. Bus connection is taken as an example in FIG. 9.

As a computer-readable storage medium, the memory 42 may be used to store software programs, computer executable programs and modules, such as program instructions/modules (for example, the acquisition module 301, the optical filter adjustment module 302 and the row number adjustment module 303 in the exposure time control apparatus) corresponding to the exposure time control method in the embodiments of the present disclosure. The processor 41 runs the software programs, instructions, and modules stored in the memory 42, thus performing various functional applications and data processing of the electronic device, i.e., implementing the exposure time control method above.

The memory 42 may mainly include a program storage area and a data storage area, wherein the program storage area may store application programs required by an operating system and at least one function. The data storage area may store data and the like created according to the use of the terminal. In addition, the memory 42 may include a high-speed random access memory, and may also include a non-volatile memory, such as at least one disk memory device, a flash memory device, or other non-volatile solid storage devices. In some examples, the memory 42 may further include memories remotely disposed with respect to the processor 41, and these remote memories may be connected to the electronic device through networks. Examples of the above networks include, but are not limited to, the Internet, enterprise intranets, local area networks, mobile communication networks, and combinations thereof.

The input device 43 may be configured to receive input numeric or character information, and generate key signal input related to user setting and function control of the electronic device. The output device 44 may include a display screen and other display devices.

The embodiments of the present disclosure further provide a storage medium containing a computer-executable instruction that, when executed by a computer processor, is configured to execute an exposure time control method:

acquiring an original exposure time of a camera and a half-flicker period of an AC light source, wherein the original exposure time is an exposure time when exposure of the camera is adjusted to a maximum exposure threshold;

if the original exposure time is less than the half-flicker period, adjusting at least one target optical filter in an optical filter assembly to a filtered state; and adjusting a number of pixel rows exposed during each exposure of the camera according to light intensity information filtered by the target optical filter so as to adjust the exposure time of the camera to an integer multiple of the half-flicker period.

Certainly, as for the storage medium containing the computer-executable instruction provided by the embodiments of the present disclosure, the computer-executable instruction is not limited to the above method operations, and may also perform related operations in the exposure time control method provided by any embodiment of the present disclosure.

Through the description of the above embodiments, those skilled in the art can clearly understand that the present disclosure can be implemented by means of software plus necessary general hardware, and certainly, can be implemented by means of hardware, but in many cases, the former is a better implementation manner. Based on such understanding, the technical solutions of the present disclosure in essence or the part contributed to the related art may be embodied in the form of a software product which is stored in a computer-readable storage medium such as a floppy disc of a computer, a Read-Only Memory (ROM), a Random Access Memory (RAM), a flash (FLASH), a hard disk, or an optical disk which include a plurality of instructions such that one computer device (which may be a personal computer, a server, or a network device, etc.) performs the methods described in each of the embodiments of the present disclosure.

It is noteworthy that in the embodiments of the above-mentioned exposure time control apparatus, various units and modules included are only divided according to functional logics, but are not limited to the above-mentioned division, as long as the corresponding functions can be realized. In addition, the specific names of each functional unit are only for convenience of distinguishing from each other, and are not used to limit the scope of protection of the present disclosure.

It should be noted that the above are only the embodiments of the present disclosure and the applied technical principles. Those skilled in the art will understand that the present disclosure is not limited to the specific embodiments herein, and various obvious changes, readjustments and substitutions can be made by those skilled in the art without departing from the scope of protection of the present disclosure. Therefore, although the present disclosure has been explained in detail through the above embodiments, the present disclosure is not limited to the above embodiments, but may include many other equivalent embodiments without departing from the concept of the present disclosure, and the scope of the present disclosure is determined by the scope of the appended claims.

INDUSTRIAL APPLICABILITY

The camera module provided by the present disclosure includes the camera, the camera includes the lens and the photosensitive element, and the camera module further includes the optical filter assembly. The optical filter in the optical filter assembly and the lens are parallel and located on different planes, and when the optical filter is in the filtered state, the optical filter is located on one side of the photosensitive element facing the lens for reducing the intensity of light entering the photosensitive element. In this way, the situation that the water ripples in the preview screen of the camera cannot be eliminated when the light intensity of the AC light source in the environment of the electronic device to which the camera belongs is too strong can be avoided, and the shooting effect of the camera and the shooting experience of the user are improved.

The invention claimed is:

1. A camera module, wherein the camera module comprises a camera, the camera comprises a lens and a photosensitive element, the photosensitive element is located at one side of the lens, and the camera module further comprises an optical filter assembly, wherein:

an optical filter in the optical filter assembly and the lens are parallel and located on different planes;

when the optical filter is in a filtered state, the optical filter is located on one side of the photosensitive element facing the lens, and is configured for reducing an intensity of light entering the photosensitive element; and when the optical filter is in an unfiltered state, the optical filter is located on a vertical plane of a connecting line between the photosensitive element and the lens, and a projection of the optical filter on the plane at which the lens is located does not overlap with the lens, wherein the photosensitive element obtains a first light intensity value and a second light intensity value, the first light intensity value being different than the second light intensity value; and wherein if an absolute value of the difference between the second light intensity value and the first light intensity value is greater than a preset change amplitude threshold, the optical filter is adjusted to the unfiltered state, wherein if the absolute value of the difference between the second light intensity value and the first light intensity value is less than the preset change amplitude threshold, a second total light transmission performance coefficient is calculated by dividing the product of a second exposure time and a first total light transmission performance coefficient by a first exposure time, and further wherein if the second total light transmission performance coefficient is greater than or equal to one, the optical filter is adjusted to the unfiltered state, and if the second total light transmission performance coefficient is less than one, the optical filter is adjusted to the filtered state.

2. The camera module according to claim 1, wherein when the optical filter is in the filtered state, the optical filter is located between the lens and the photosensitive element, or located at the other side of the lens.

3. The camera module according to claim 1, wherein a projection of the lens on the plane at which the optical filter is located is disposed in the optical filter.

4. The camera module according to claim 1, wherein the optical filter comprises a full-band optical filter that absorbs light of each wave band with equal amplitude and an optical filter that absorbs light of a photosensitive wave band of the photosensitive element with equal amplitude.

5. The camera module according to claim 1, further comprising a telescopic support arm in one-to-one correspondence with the optical filter in the optical filter assembly, wherein:

a telescopic end of the telescopic support arm is provided with a corresponding optical filter, when the telescopic support arm is unextended, the optical filter is in the unfiltered state, and when the telescopic support arm is extended, the optical filter is in the filtered state; or, when the telescopic support arm is extended, the optical filter is in the unfiltered state, and when the telescopic support arm is unextended, the optical filter is in the filtered state.

6. The camera module according to claim 5, further comprising a driving device in one-to-one correspondence with the telescopic support arm, wherein:

the driving device is connected with the telescopic end of the telescopic support arm, and is configured for driving the telescopic support arm to switch between the unextended state and the extended state.

7. The camera module according to claim 6, wherein the optical filter assembly comprises a plurality of optical filters with fixed light transmission performances, and the light transmission performances of the plurality of optical filters are different from each other.

8. The camera module according to claim 6, wherein the optical filter assembly comprises a linearly gradient optical filter, and correspondingly, the driving device is further configured for adjusting a light transmission performance of the linearly gradient optical filter by adjusting an extension length of the telescopic support arm.

9. The camera module according to claim 1, wherein the optical filter assembly further comprises a housing, and the housing covers the optical filter when the optical filter is in the unfiltered state.

10. An electronic device, comprising the camera module according to claim 1.

11. The camera module according to claim 1, further comprising an input device, wherein the input device is configured to ask a user if the optical filter needs to be adjusted to the filtered state.

12. An exposure time control method, comprising:

acquiring an original exposure time of a camera and a half-flicker period of an AC light source, wherein the original exposure time is an exposure time when exposure of the camera is adjusted to a maximum exposure threshold;

if the original exposure time is less than the half-flicker period, adjusting at least one target optical filter in an optical filter assembly to a filtered state;

calculating an adjustable maximum exposure time and an adjustable minimum exposure time of the camera under current light intensity, where the adjustable maximum exposure time and the adjustable minimum exposure time define an exposure time adjustment range;

choosing a target exposure time within the exposure time adjustment range, wherein the target exposure time is an integer multiple of the product of a number of pixels in each row, a time needed to generate one pixel, and a number of pixel rows exposed;

calculating the number of pixel rows exposed by dividing the target exposure time by the number of pixels in each row and the time needed to generate one pixel, wherein the number of pixel rows exposed is an integer value; and adjusting the number of pixel rows exposed during each exposure of the camera, wherein a photosensitive element of the camera obtains a first light intensity value and a second light intensity value, the first light intensity value being different than the second light intensity value; and wherein if an absolute value of the difference between the second light intensity value and the first light intensity value is greater than a preset change amplitude threshold, the optical filter is adjusted to an unfiltered state, wherein if the absolute value of the difference between the second light intensity value and the first light intensity value is less than the preset change amplitude threshold, a second total light transmission performance coefficient is calculated by dividing the product of a second exposure time and a first total light transmission performance coefficient by a first exposure time, and further wherein if the second total light transmission performance coefficient is greater than or equal to one, the optical filter is adjusted to the unfiltered state, and if the second total light transmission performance coefficient is less than one, the optical filter is adjusted to the filtered state.

13. The method according to claim 12, wherein when the optical filter in the optical filter assembly is an optical filter with fixed light transmission performance, the adjusting the at least one target optical filter in the optical filter assembly from an unfiltered state to the filtered state comprises:
calculating a light intensity reduction proportionality of the camera according to the original exposure time and the half-flicker period;
determining the target optical filter according to the light intensity reduction proportionality and the light transmission performance of the optical filter; and
adjusting a telescopic support arm connected with the target optical filter from an unextended state to an extended state by a target driving device corresponding to the target optical filter.

14. The method according to claim 12, wherein when the optical filter in the optical filter assembly is a linearly gradient optical filter, the adjusting the at least one target optical filter in the optical filter assembly from an unfiltered state to the filtered state comprises:
calculating a light intensity reduction proportionality of the camera according to the original exposure time and the half-flicker period;
determining an extension length of a telescopic support arm according to the light intensity reduction proportionality and a light transmission change coefficient of the linearly gradient optical filter; and
controlling the telescopic support arm by a driving device to extend according to the extension length.

15. The method according to 12, wherein the adjusting the at least one target optical filter in the optical filter assembly to the filtered state comprises:
adjusting all the optical filters in the filtered state in the optical filter assembly to an unfiltered state;
determining at least one optical filter in the optical filter assembly as the target optical filter based on an intensity of light received by a photosensitive element and a preset range of incident light quantity; and
adjusting the target optical filter from the unfiltered state to the filtered state.

16. A non-transitory computer-readable storage medium storing a computer program thereon, wherein the computer program, when executed by a processor, implements the exposure time control method according to claim 12.

17. An exposure time control apparatus, comprising:
an acquisition module configured for acquiring an original exposure time of a camera and a half-flicker period of an AC light source, wherein the original exposure time is an exposure time when exposure of the camera is adjusted to a maximum exposure threshold;
an optical filter adjustment module configured for, when the original exposure time is less than the half-flicker period, adjusting at least one target optical filter in an optical filter assembly to a filtered state;
an input device configured to ask a user if the optical filter needs to be adjusted to the filtered state, wherein the optical device remains in an unfiltered state if the user chooses no; and
a row number adjustment module configured for adjusting a number of pixel rows exposed during each exposure of the camera according to light intensity information filtered by the target optical filter so as to adjust the exposure time of the camera to an integer multiple of the half-flicker period,
wherein a photosensitive element of the camera obtains a first light intensity value and a second light intensity value, the first light intensity value being different than the second light intensity value; and
wherein if an absolute value of the difference between the second light intensity value and the first light intensity value is greater than a preset change amplitude threshold, the optical filter is adjusted to the unfiltered state,
wherein if the absolute value of the difference between the second light intensity value and the first light intensity value is less than the preset change amplitude threshold, a second total light transmission performance coefficient is calculated by dividing the product of a second exposure time and a first total light transmission performance coefficient by a first exposure time, and further wherein if the second total light transmission performance coefficient is greater than or equal to one, the optical filter is adjusted to the unfiltered state, and if the second total light transmission performance coefficient is less than one, the optical filter is adjusted to the filtered state.

18. The apparatus according to claim 17, wherein when the optical filter in the optical filter assembly is an optical filter with fixed light transmission performance, the optical filter adjustment module comprises:
a first ratio calculation unit configured for calculating a light intensity reduction proportionality of the camera according to the original exposure time and the half-flicker period when the original exposure time is less than the half-flicker period;
an optical filter determination unit configured for determining the target optical filter according to the light intensity reduction proportionality and the light transmission performance of the optical filter; and
a state adjustment unit configured for adjusting a telescopic support arm connected with the target optical filter from an unextended state to an extended state by a target driving device corresponding to the target optical filter.

19. The apparatus according to claim 17, wherein when the optical filter in the optical filter assembly is a linearly gradient optical filter, the optical filter adjustment module comprises:
a second ratio calculation unit configured for calculating a light intensity reduction proportionality of the camera according to the original exposure time and the half-flicker period;
a length determination unit configured for determining an extension length of a telescopic support arm according to the light intensity reduction proportionality and a light transmission change coefficient of the linearly gradient optical filter; and
an extension control unit configured for controlling the telescopic support arm by the driving device to extend according to the extension length.

* * * * *